(12) United States Patent
Nelson et al.

(10) Patent No.: US 6,887,440 B2
(45) Date of Patent: May 3, 2005

(54) EDGE-CONNECTED NON-THERMAL PLASMA EXHAUST AFTER-TREATMENT DEVICE

(75) Inventors: David Emil Nelson, Independence Township, MI (US); Bob Xiaobin Li, Grand Blanc, MI (US); Tom L. Stuart, Pendleton, IN (US)

(73) Assignee: Delphi Technologies, Inc., Troy, MI (US)

( * ) Notice: Subject to any disclaimer, the term of this patent is extended or adjusted under 35 U.S.C. 154(b) by 544 days.

(21) Appl. No.: 10/045,579

(22) Filed: Nov. 7, 2001

(65) Prior Publication Data

US 2002/0131918 A1 Sep. 19, 2002

Related U.S. Application Data

(60) Provisional application No. 60/249,231, filed on Nov. 16, 2000.

(51) Int. Cl.[7] ............................................... B01J 19/08
(52) U.S. Cl. .................................................. 422/186.04
(58) Field of Search ........................... 422/186.04, 906, 422/907

(56) References Cited

U.S. PATENT DOCUMENTS

| | | | |
|---|---|---|---|
| 6,139,694 A | * 10/2000 | Rogers et al. | 204/177 |
| 6,309,610 B1 | * 10/2001 | Nejezchleb et al. | 422/186.04 |
| 6,338,827 B1 | 1/2002 | Nelson et al. | 422/186.04 |
| 6,354,903 B1 | 3/2002 | Nelson | 445/58 |
| 6,368,451 B1 | 4/2002 | Goulette et al. | 174/152 R |
| 6,423,190 B2 | 7/2002 | Hemingway et al. | 204/164 |
| 6,464,945 B1 | 10/2002 | Hemingway | 422/174 |
| 6,482,368 B2 | 11/2002 | Hemingway et al. | 422/186.04 |
| 6,537,507 B2 | 3/2003 | Nelson et al. | 422/186 |
| 6,638,484 B2 | 10/2003 | Nelson et al. | 422/186.04 |

FOREIGN PATENT DOCUMENTS

WO    WO0049278    * 8/2000

* cited by examiner

*Primary Examiner*—Rodney G. McDonald
(74) *Attorney, Agent, or Firm*—Paul L. Marshall

(57) ABSTRACT

An edge-connected non-thermal plasma reactor includes an element having an edge-connected frame comprising a pair of dielectric edge connectors secured at opposite ends to a pair of outer dielectric plates. The dielectric edge connectors have a backplane and a plurality of tines protruding along one major surface of the backplane. The tines are spaced apart from one another at regular intervals so as to form pockets between adjacent tines. Alternating polarity electrode plates comprising a dielectric barrier plate having an electrode and terminal connection lead disposed on the dielectric barrier are arranged within the edge-connected frame so as to define the presence of a dielectric barrier next to a plasma cell, with the pockets engaging opposite ends of the electrode plates. Double and single dielectric edge-connected reactor elements are provided.

37 Claims, 6 Drawing Sheets

EDGE-CONNECTED NON-THERMAL PLASMA EXHAUST AFTER-TREATMENT DEVICE

CROSS-REFERENCE TO RELATED APPLICATIONS

The present application claims priority to U.S. Provisional Application No. 60/249,231, of David E. Nelson, et al., filed Nov. 16, 2000, entitled "Edge-connected Non-thermal Plasma Exhaust After Treatment Device," which is hereby incorporated by reference herein in its entirety.

TECHNICAL FIELD

This invention relates to reactors for chemical reduction of nitrogen oxide (NOx) emissions in the exhaust gases of automotive engines, particularly diesel and other engines operating with lean air fuel mixtures that produce relatively high emission of NOx. More particularly, the invention pertains to an edge-connected non-thermal plasma exhaust after-treatment device.

BACKGROUND OF THE INVENTION

In recent years, non-thermal plasma generated in a packed bed reactor has been shown to be effective in reducing nitric oxides (NOx) produced by power plants and standby generators. These units usually have a reducing agent, such as urea, to enhance the conversion efficiency. The packed bed reactor consists essentially of a high voltage center electrode inserted into a cylinder of dielectric material, usually a form of glass or quartz.

An outside or ground electrode is formed by a coating of metal in various forms, including tape, flame spray, mesh, etc. The space between the center electrode and the inside diameter of the dielectric tube is filled or packed with small diameter glass beads. When high voltage alternating current is applied to the center electrode, the surfaces of the beads go into corona, producing a highly reactive and selective surface for inducing the desired reaction in the gas.

Unfortunately, the packed bed design with its loose beads and glass dielectric is impractical for use in the conditions found in a mobile emitter, such as a car or truck. The vibration and wide temperature swings of the vehicle system would damage the packed bed and the necessary temperature and vibration isolation needed to make it survive would not be cost effective.

A stacked plate reactor for use with diesel engines and other engines operating with lean air fuel mixtures is disclosed in commonly assigned U.S. patent application Ser. No. 09/465,073, filed Dec. 16, 1999, entitled "Non-thermal Plasma Exhaust NOx Reactor," which is hereby incorporated by reference herein in its entirety. Disclosed therein is a reactor element comprising high dielectric, nonporous, high temperature insulating means defining a group of relatively thin stacked cells forming gas passages and separated by the insulating means. Alternate ground and charge carrying electrodes in the insulating means on opposite sides of the cells are disposed close to, but electrically insulated from, the cells by the insulating means. The electrodes may be silver or platinum material coated onto alumina plates. Conductive ink is sandwiched between two thin nonporous alumina plates or other suitable insulating plates to prevent arcing while providing a stable electrode spacing for a uniform electric field. The electrodes are coated onto alumina in a pattern that establishes a separation between the electrodes and the connectors of alternate electrodes suitable to prevent voltage leakage.

In commonly assigned U.S. patent application Ser. No. 09/511,590, filed Feb. 23, 2000, entitled "Design and Method of Manufacturing a Plasma Reactor for Treating Auto Emissions—Stacked Shapes," which is also hereby incorporated by reference herein in its entirety, a non-thermal plasma reactor element is prepared from a planar arrangement of formed building blocks of dielectric material. The formed shape defines an internal cell in the plasma reactor having an exhaust passage for flowing exhaust gas to be treated therethrough. Individual cells are provided with a conductive print disposed thereon to form electrodes and connectors. In a preferred embodiment, the conductive print comprises a continuous grid pattern having a cutout region disposed opposite the terminal connector for reducing potential charge leakage. Multiple cells are stacked and connected together to form a multi-cell stack.

Commonly assigned U.S. patent application Ser. No. 09/517,681, filed Mar. 2, 2000, entitled "Plasma Reactor Design for Treating Auto Emissions—Durable and Low Cost" which is hereby incorporated by reference herein in its entirety, discloses a non-thermal plasma reactor element for conversion of exhaust gas constituents. The reactor comprises an element prepared from an extruded monolith of dense dielectric material having a plurality of channels separated by substantially planar dielectric barriers. Conductive material printed onto selected channels forms conductive channels that are connected along bus paths to form an alternating sequence of polarity, separated by exhaust channels. Conductive channels and channels not selected for exhaust flow are plugged at end portions of the monolith with a material suitable for excluding exhaust gases and for preventing electrical leakage between conductive channels. Exhaust channels, disposed between opposite polarity conductive channels, are left uncoated and unplugged. During operation, exhaust gas flows through exhaust channels and is treated by the high voltage alternating current flowing through the conductive channels. The planar shape of the dielectric barriers provides a uniform electrical response throughout the exhaust channels.

Commonly assigned U.S. patent application Ser. No. 09/517,682, filed Mar. 2, 2000, entitled "Method Of Manufacture Of A Plasma Reactor With Curved Shape For Treating Auto Emissions," which is hereby incorporated by reference herein in its entirety, discloses a non-thermal plasma rector element wherein a swept shape substrate is formed and treated to create the non-thermal plasma reactor element. The substrate is formed via extrusion providing a series of nested, concentric dielectric barriers. Selected channels are coated with conductive material to form conductor channels for forming an electric field around exhaust channels. Conductive channels and channels not selected for exhaust flow are plugged at end portions of the monolith with a material suitable for excluding exhaust gases and preventing electrical charge leakage between conductive channels. Exhaust channels, disposed between opposite polarity conductive channels, are left uncoated and unplugged.

While the above non-thermal plasma reactors meet some of the current needs and objectives, additional problems remain to be solved to achieve improved reactor and volumetric efficiency, simplified assembly, and reduced cost. For example, current stacked planar reactors have a parting line when stacked that lies in the same plane as the metal electrode print. Due to the finite thickness of the metal electrode print and camber or thickness variation that may be present in one or both of the dielectric layers, there is a resultant gap between the layers. When the reactor is energized with high voltage, there is a tendency for charge to leak through this gap to the nearest ground path, causing thermal arcing. In an effort to solve this problem, current designs provide a separation (typically about 19 millimeters) between the edge of the electrode and the edge of the dielectric layer. Unfortunately, the potential active area of the electrode is effectively reduced by the amount of the separation.

In addition, current stacked planar reactors require substantial fixturing to align pieces during assembly. Planar reactors using metallized plates and discrete spacers require fixturing to hold each spacer in place relative to the metallized plates during assembly. Formed c-shapes and box shapes solve some of these problems by eliminating the need for spacers and are less expensive to assemble. However, some fixturing is required to align the shapes into the stack.

Further, stacked planar reactors rely upon a stack of substrates or shapes that determine the overall height. Since each layer has a thickness variation and camber tolerance, electrode print thickness variation, and possibly burrs, there is a substantial potential variation in stack height. These issues complicate canning the reactor substrate to withstand severe applications, such as automotive after-treatment, since variation that exceeds about 10 millimeters is typically accommodated by custom sizing or other expensive canning methods.

Extruded monolithic substrates used as the building blocks for the reactor element are not prone to the parting line gap, excessive height variation, or excessive fixturing and handling problems. However, structural webs or ligaments within plasma channels, which may be employed to impart structural integrity, can potentially adversely affect constituent conversion efficiency.

There remains a need in the art for an improved non-thermal plasma reactor providing reactor and volumetric efficiency, simplified assembly, and reduced overall cost.

SUMMARY OF THE INVENTION

The present invention provides an edge-connected non-thermal plasma reactor substrate including an edge-connected frame comprising a pair of dielectric edge connectors secured at opposite ends to first and second outer dielectric plates. The dielectric edge connectors comprise a backplane and a plurality of tines protruding along at least one major surface of the backplane, the plurality of tines being spaced apart from one another at regular intervals so as to form pockets between adjacent tines. A plurality of alternating polarity electrode plates include a dielectric barrier plate having an electrode and terminal connection lead disposed on the dielectric barrier plate. The electrode plates are disposed within the edge-connected frame in an alternating polarity arrangement that defines the presence of at least one dielectric barrier next to a plasma cell with the pockets compliantly engaging opposite ends of the electrode plates.

In a preferred embodiment, the element comprises a double dielectric edge-connected reactor element having plasma cells bounded on top and bottom by a dielectric barrier. In one embodiment, the double dielectric edge-connected element comprises first and second mirror image electrode plates paired together so as to sandwich the electrodes between the paired electrode plates. The electrode plate pairs are inserted into the pockets of the edged-connected frame so as to provide a double dielectric edge-connected reactor element having plasma cells bounded at top and bottom by dielectric. In one embodiment, the top and bottom most pockets formed between the top and bottom most tines and the outer dielectric plates each have a single electrode plate disposed therein with the electrode facing away from the plasma cell such that the top and bottom most plasma cells are also bounded at top and bottom by dielectric barriers.

In an alternate double dielectric edge-connected reactor element embodiment, paired mirror image electrode plates are used throughout, rather than employing single electrode plates at the top and bottom outer most pockets. While somewhat more costly since the paired electrode plates are not required at the top and bottom most pockets to create a functional double dielectric element, this embodiment advantageously provides simplified processing.

In yet another double dielectric barrier edge-connected reactor element embodiment, electrode plate-dielectric barrier plate pairs are disposed at the top and bottom most pockets, with the electrode facing away from the plasma cell, and mirror image electrode plate pairs are disposed throughout the body of the element.

In another embodiment, a single dielectric edge-connected reactor element is provided having plasma cells bounded on one side by dielectric and on an opposite side by electrode. In this embodiment, a single electrode plate is disposed in each pocket of the edge-connected frame to effect an alternating polarity arrangement wherein each plasma cell is bounded on one side by dielectric and on an opposite side by an electrode.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several Figures.

DESCRIPTION OF THE PREFERRED EMBODIMENT

Figure 1:
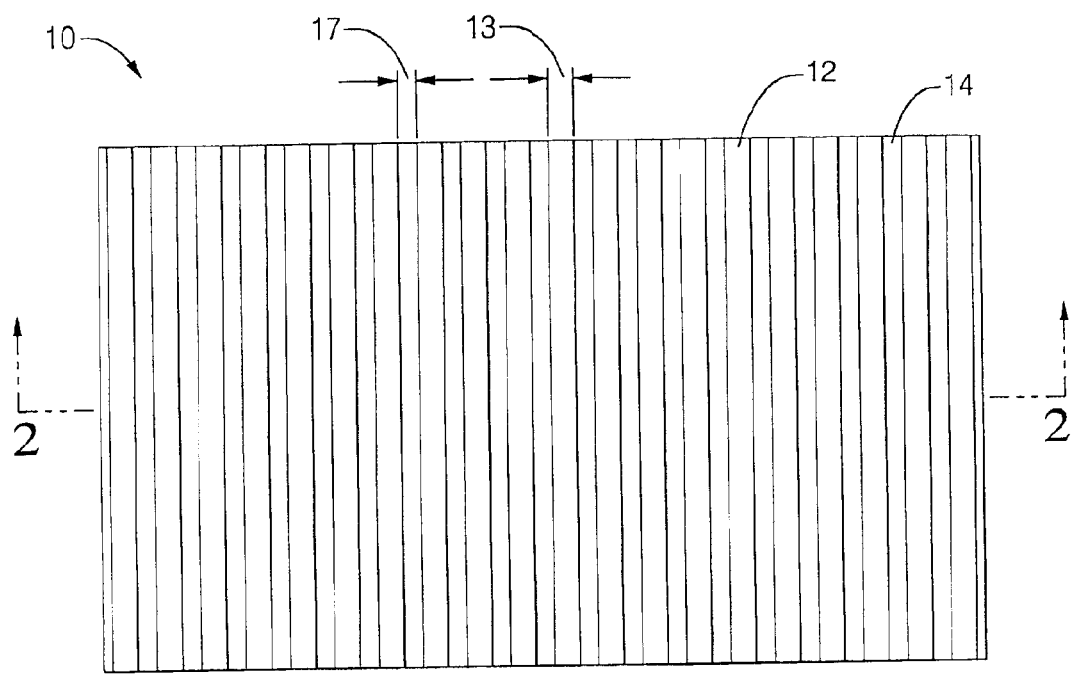
FIG. 1 is a top view of a dielectric edge connector in accordance with the present invention.
Figure 2:
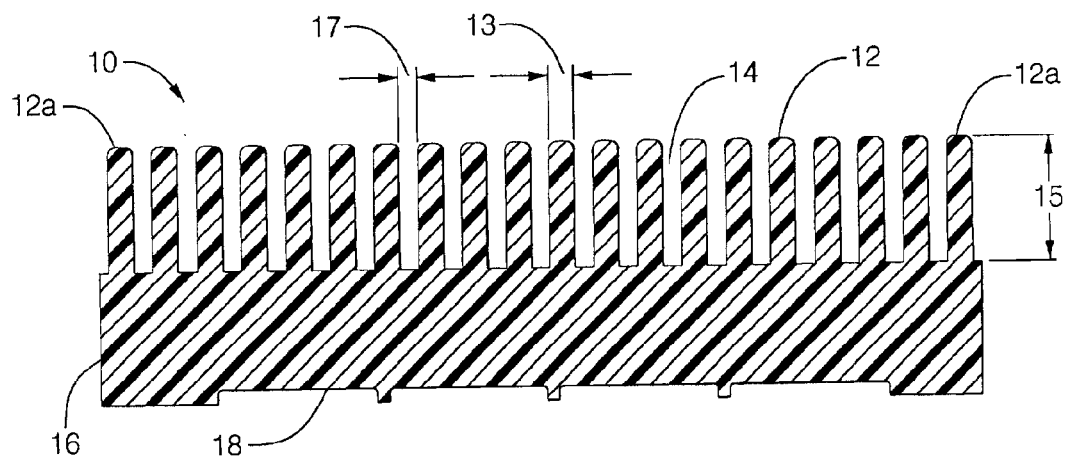
FIG. 2 is a sectional view taken along the line 2—2 of the edge connector of FIG. 1.

FIGS. 1 and 2 show an edge-connector 10 in accordance with one possible embodiment of the present invention. FIG. 1 provides a top view and FIG. 2 provides a sectional view taken along the line 2—2 of FIG. 1. The edge-connector 10 comprises a dielectric material. In a preferred embodiment, the edge-connector 10 is constructed from a material having a low dielectric constant (a "low-k" material) to minimize charge build-up during plasma operation that could affect conversion efficiency. In an alternate embodiment, a low-k constituent may be used within a higher k material to lower the dielectric constant for improved performance. Dielectric materials suitable for the edge-connector 10 include, but are not limited to, alumina, cordierite, or mullite. The edge connector 10 may be prepared by any suitable means. Preferably, the edge-connector 10 is manufactured using high precision processes such as ceramic injection molding. Suitable processes include, but are not limited to, ceramic injection molding, pressing, or extrusion techniques.

The edge-connector 10 includes tines 12 having a width 13 and a length 15. The edge-connector 10 is constructed having a tine width 13 and length 15 determined in accordance with the particular system. Suitable tine widths 13 typically comprise, but are not limited to, for example, from about 0.5 millimeters to about 2.0 millimeters. Most typically, tines 12 have a width 13 of about 0.9 millimeters. Tines 12 most typically comprise a length 15 of about 4 to about 6 millimeters. Tines 12 are disposed at regular intervals along a structural backplane 16 connecting the tines 12 together. When the non-thermal plasma reactor element is assembled, pockets 14 having a width 17, formed by adjacent pairs of tines 12, engage opposite ends of the electrode plates (electrode plates 26, 28 shown in FIGS. 5 and 6) and serve to partially constrain the electrode plates 26, 28 in position.

The backplane 16 is continuous over the sides of the edge-connected non-thermal plasma reactor element when assembled thereby preventing charge leakage between electrodes or between electrodes and bus paths or the reactor housing. Optionally, ribs or textured surfaces 18 disposed on the surface of the edge connector backplane 16 create a gripping surface 18 for mat material 50 holding the element inside the reactor housing 48 (housing 48 and mat 50 shown in FIG. 7). The textured surfaces or ribs 18 also serve to create a more tortuous path between the backplane 16 and the mat material 50 that also reduces the potential for untreated gas to leak between the edge connector backplane and the mat 50.

Figure 3:
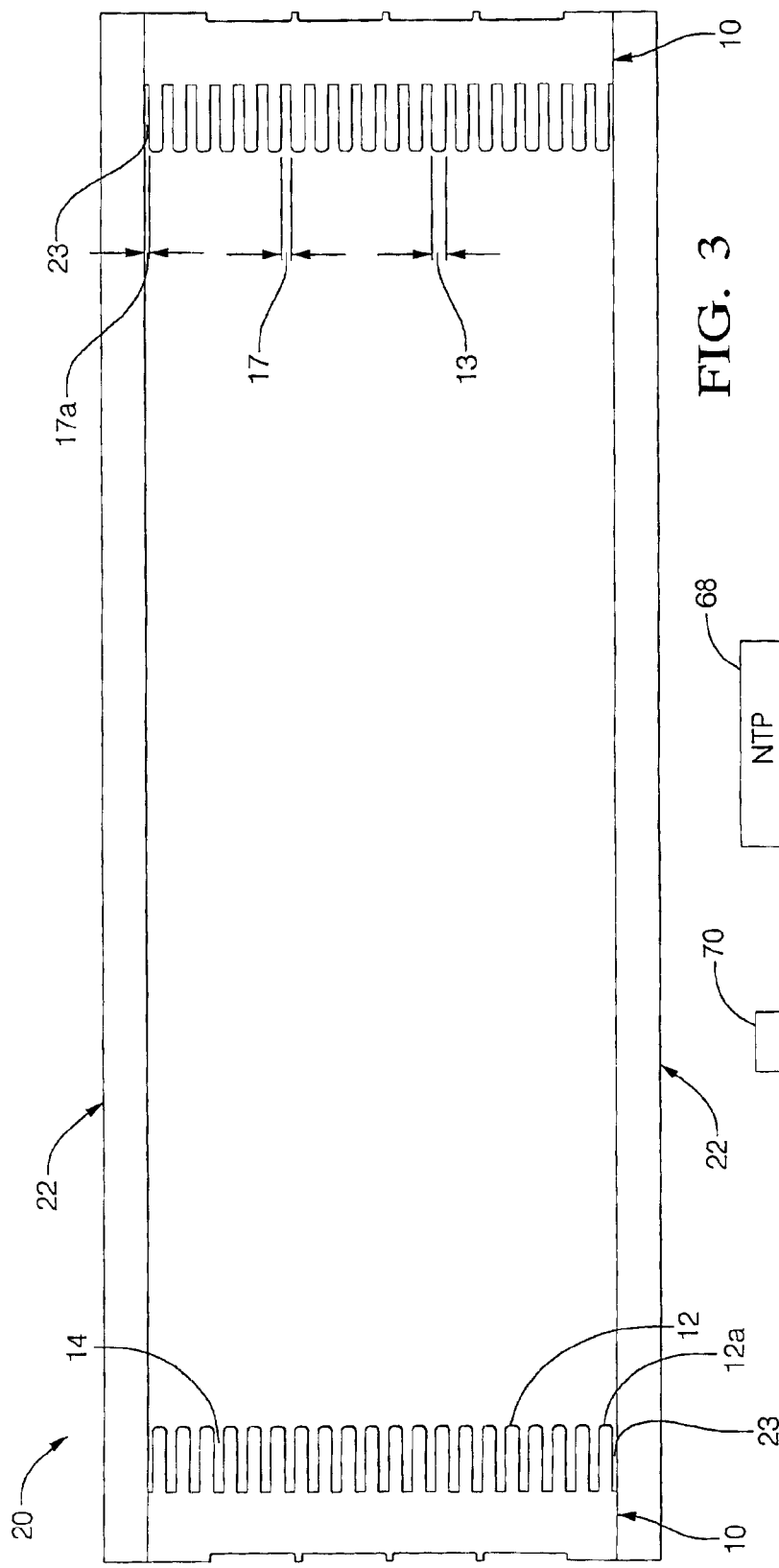
FIG. 3 is an end view of an edge-connected frame in accordance with the present invention.

An edge-connected frame 20 is shown in FIG. 3 and includes a pair of edge-connectors 10 secured a distance apart from one another by a pair of outer dielectric plates 22. The outer dielectric plates 22 and the endmost tines 12a adjacent the outer dielectric plates 22 create top and bottom pockets 23 having a width 17a that is one half the width 17 of the pockets 14. Typical spacing between endmost tines 12 and outer dielectric plates 22 is about 0.5 to about 1.0 mm.

The edge-connected frame 20 comprising connectors 10 and outer plates 22 may comprise an integral edge-connected frame constructed directly, such as by extrusion. Alternately, the edge-connected frame 20 may be constructed from discrete sections, such as by two edge connectors 10 joined with two dielectric outer plates 22. Advantageously, the edge-connected frame 20 enables electrode plates 26, 28 (shown in FIGS. 5 and 6) to be dropped into position from the front or rear of the frame during assembly. Further, the edge-connected frame 20 may be formed after electrode plates 26, 28 are inserted into the pockets 14 of the edge connectors 10.

When the edge-connected frame 20 is constructed from sections, the sections may be secured using any suitable method, with the typical connection approach comprising using a lap joint with adhesive media between the outer plate 22 and the engaging surfaces 58 (engaging surface 58 shown in FIG. 10) of the edge connector backplane 16. Alternatively, one or both of the edge connectors 10 may be manufactured with an integral stop to improve ease of assembly.

Figures 4, 5:
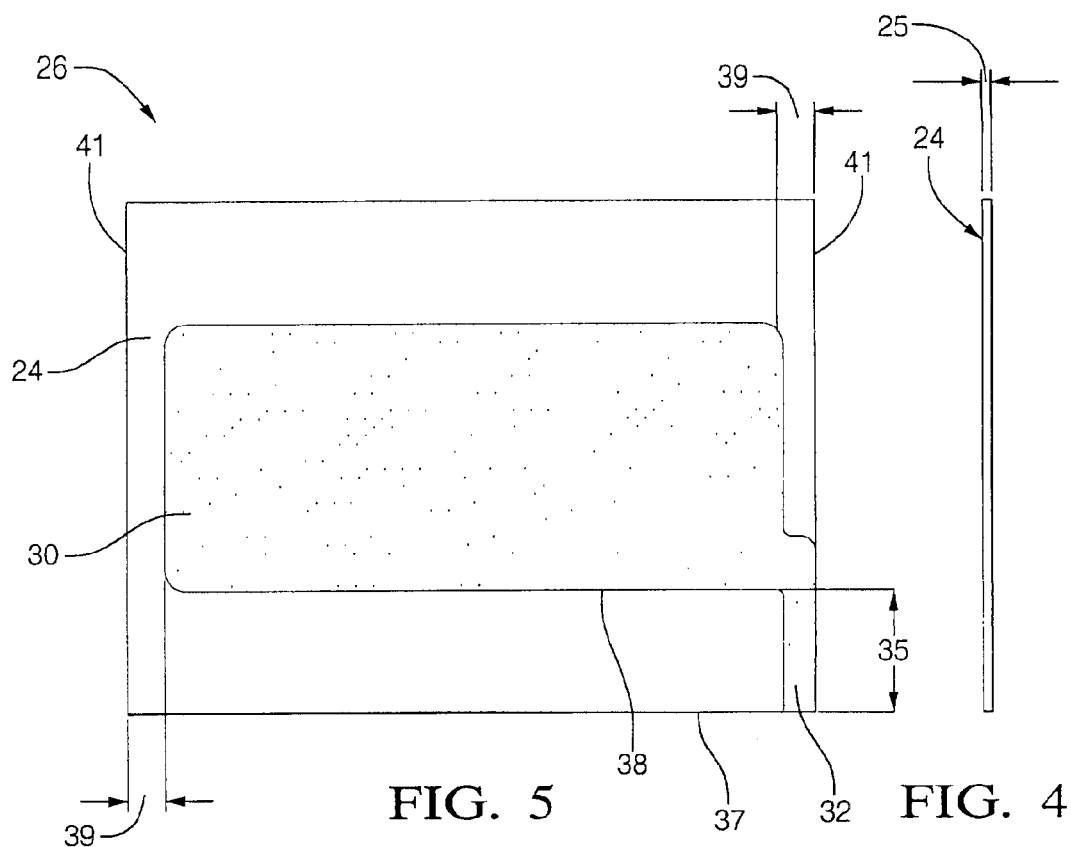
FIG. 4 is a side view of a dielectric barrier plate used to form a dielectric barrier electrode plate in accordance with the present invention.
FIG. 5 is a top view of a dielectric barrier plate as in FIG. 4 having a first conductive electrode pattern disposed thereon to provide a first polarity dielectric barrier electrode plate.

FIG. 4 shows a side view of a thin dielectric barrier plate 24 used to prepare the dielectric barrier electrode plates 26, 28. The dielectric barrier plates 24 are thin plates having a width (thickness) 25 of about 0.38 millimeters to about 1 millimeter. Most typically, the dielectric barrier plates 24 have a width 25 of about 0.5 millimeters.

Figure 6:
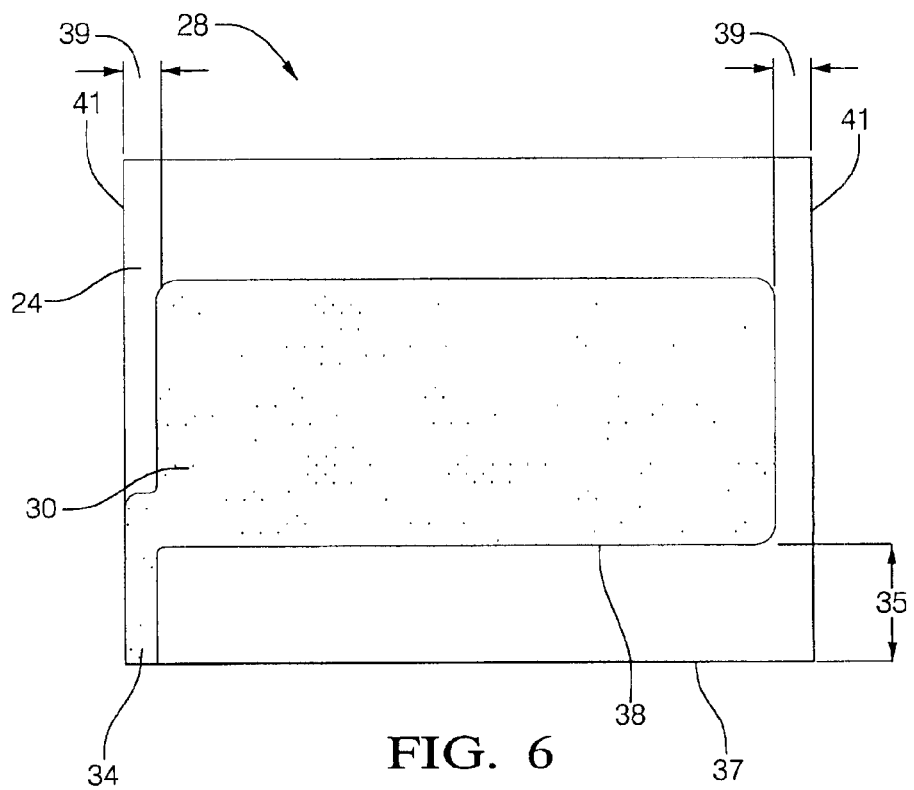
FIG. 6 is a top view of a dielectric barrier plate as in FIG. 4 having a second conductive electrode pattern disposed thereon to provide a second polarity dielectric barrier electrode plate.

FIGS. 5 and 6 show the preferred electrode plate designs, with FIG. 5 being oriented for ground polarity and FIG. 6 oriented for power polarity, when used for single dielectric construction. For preferred double dielectric construction, the electrode plate designs in FIGS. 5 and 6 are each used between every cell, with mirror image electrode plate pairs matched up and with the plate pairs alternately oriented for the correct polarity. Electrode plates 26 (FIG. 5) and 28 (FIG. 6) comprise a dielectric barrier plate 24 having an electrode 30 and terminal connection leads 32, 34 disposed thereon. Terminal connection lead 32 is oriented for the ground bus terminal, while terminal connection lead 34 is oriented for the power bus terminal. The distance 35 between the front edge 37 of the electrode plates 26, 28 to the edge 38 of the electrode 30 is large relative to the width 13 of the tines 12 to effectively increase the dielectric path length between alternate polarity electrodes at the front or rear of the reactor element. This configuration advantageously prevents parasitic charge leakage between alternate polarity electrodes at the front or rear of the assembly.

Advantageously, a small setback 39 wherein the electrode 30 extends to within a short distance from the edges 41 of the dielectric plate 24 engaging the tines 12 increases the active electrode area. For example, in one embodiment, the electrode 30 extends to within about 5 millimeters from the edges 41 of the dielectric plate 24. The small setback 39 is much less than can be achieved with stacked designs, which require a minimum setback distance of about 19 millimeters. The length 15 of the edge connector tines 12 determines the setback of the electrode 30 from the sides of the dielectric plate 24. Shorter tines 12 allow more active electrode area 12. The extent to which the length 15 of tines 12 can be shortened is constrained by the resultant increasing likelihood of parasitic charge leakage. The parasitic charge leakage can occur from the side of the electrode, along the electrode plate to the opposite side of the electrode plate, along and around the tine to the opposite polarity electrode plate, and along and around the opposite polarity electrode plate to the opposite polarity electrode. The length 15 of tines 12 has an outsized effect on the dielectric path length. For example, a 1 millimeter reduction in tine length 15 reduces the effective dielectric path by about 4 millimeters.

Figure 7:
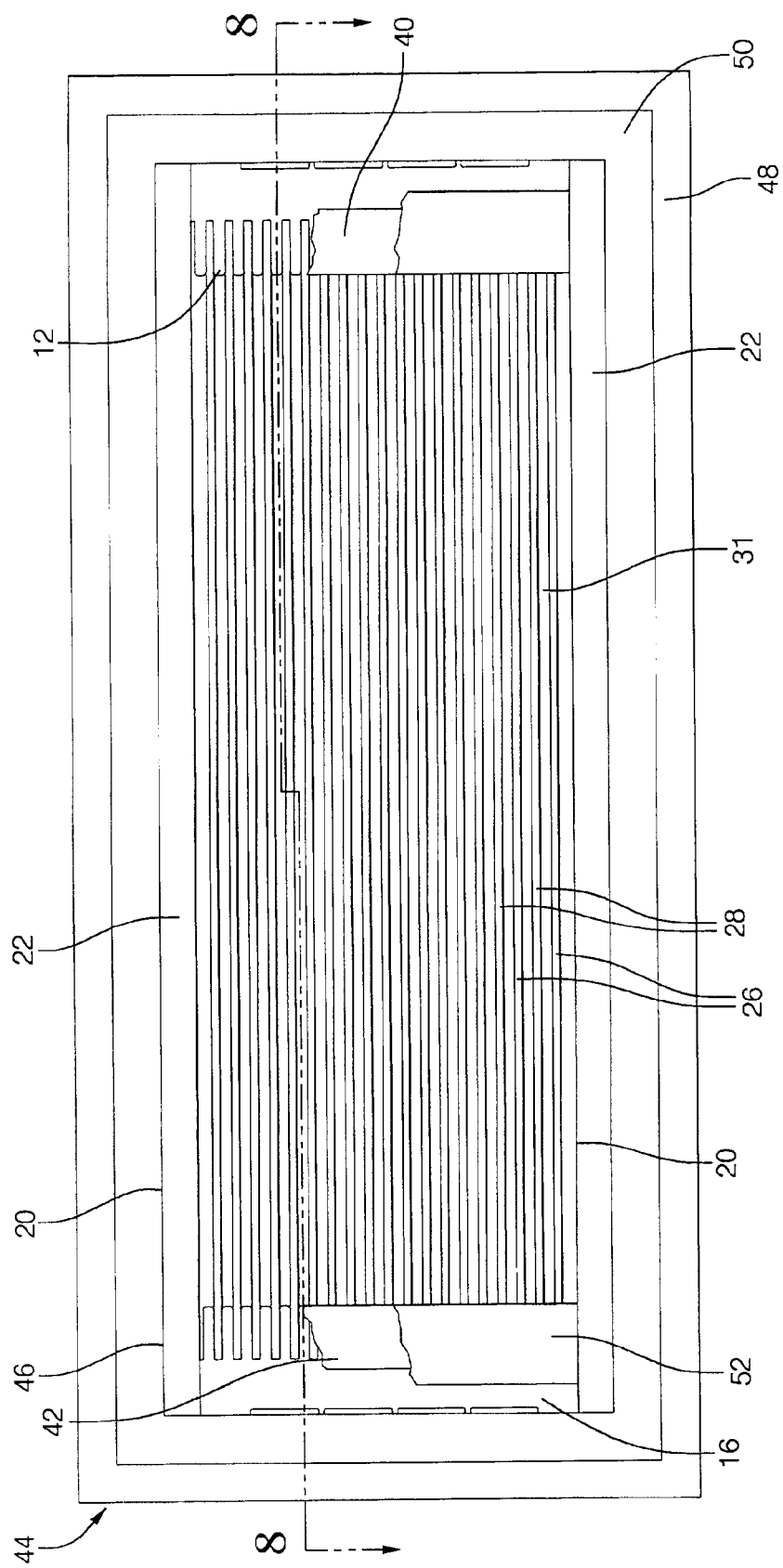
FIG. 7 is an end view of an edge-connected multi-cell non-thermal plasma reactor having an edge-connected element in accordance with the present invention.

FIG. 7 shows an end view of an edge-connected non-thermal plasma reactor 44 having edge-connected element 46 disposed in a housing 48. A retaining mat 50 is disposed in the housing 48 between the edge-connected element 46 and the housing 48. The electrode plates 26 and 28 are arranged within the frame 20 in an alternating order that defines the presence of a dielectric barrier next to a plasma cell 31 and aligns the electrode polarities correctly. FIG. 7 is partially cut away to show ground bus path 40 and power bus path 42 underneath a layer of dielectric encapsulent 52. Preferably, dielectric encapsulent 52 is disposed along both sides of the element 46 covering bus paths 40, 42 and extending onto the edge-connector backplane 16.

Figure 8:
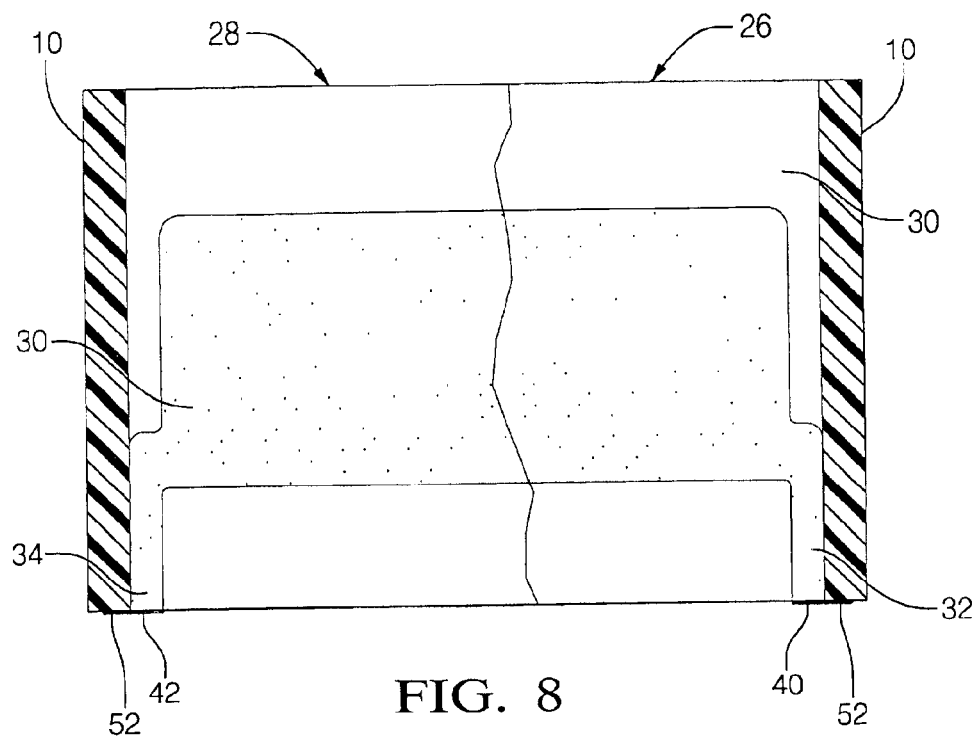
FIG. 8 is a view taken along the line 8—8 of FIG. 7, in partial cutaway, to show a pair of opposite polarity dielectric barrier electrode plates comprising a portion of the substrate stack forming the element of FIG. 7.

FIG. 8, taken along the line 8—8 of FIG. 7, is partially cutaway to show the arrangement of alternating polarity electrode plates 26, 28 disposed on opposite sides of a plasma cell in the stack comprising the element 46. FIG. 8 further shows the electrode 30 ink pattern alignment with the edge-connector 10 and the electrode terminal lead locations for the ground terminal lead 32 on the electrode plate 26 lying on the opposite side of the cell 31 beneath the electrode plate 28 having power terminal lead 34.

Figure 9:
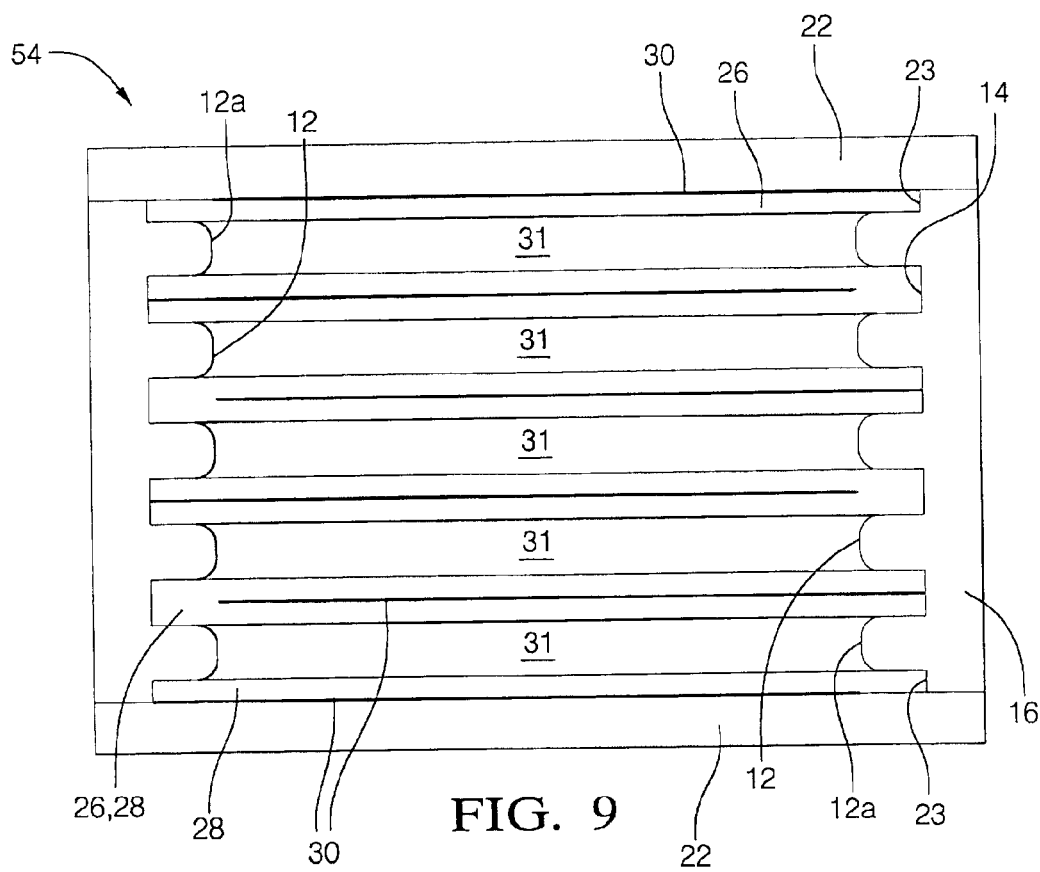
FIG. 9 is a sectional end view taken along a line midway along the length of a double dielectric barrier edge-connected non-thermal plasma reactor element in accordance with the present invention.

The alternating polarity electrode plates 26, 28 are assembled into the edge-connected frame 20, with the plates 26, 28 inserted into the pockets 14 of the edged connectors 10. In a preferred embodiment, shown in FIG. 9, a double dielectric barrier edge-connected reactor element 54 is provided comprising two mirror image electrode plates 26, 28 paired together with the electrodes 30 sandwiched in the middle to form a double dielectric edge-connected element. Each electrode plate pair is inserted into the pockets 14 forming plasma cells 31 between adjacent plate pairs where each plasma cell 31 is bound by dielectric on top walls and bottom walls. In this embodiment, all pockets 14 (except for the top and bottom pockets 23 adjacent the outer dielectric plates 22) contain a double dielectric electrode plate pair 26, 28. The top and bottom pockets 23 adjacent the top and bottom dielectric outer plates 22 contain only one electrode plate, with the electrode 30 facing away from the cell 31. The electrode plate pairs 26, 28 and top and bottom electrode plates are arranged to alternate polarity with each successive pocket 14. This double dielectric design is most efficient for conversion of exhaust constituents. Optionally, the double dielectric barrier edge-connected elements may employ an electrode plate pairing comprising a laminate sandwich construction having a dielectric plate-electrode- and dielectric plate arrangement, where the electrode is in close enough contact to both dielectric layers sufficient to avoid parasitic arcing. Alternately, this embodiment may employ a dielectric laminate or coating disposed on opposite sides of a conductor to form a dielectric-conductor-dielectric arrangement.

In an alternate double dielectric edge-connected reactor element embodiment, paired mirror image electrode plates 26, 28 are used throughout, rather than employing single electrode plates at the top and bottom outer most pockets.

In yet another double dielectric barrier edge-connected reactor element embodiment, electrode plate-dielectric barrier plate pairs are disposed at the top and bottom most pockets 23, with the electrode 30 facing away from the plasma cell 31, and mirror image electrode plate pairs 26, 28 are disposed throughout the body of the element in pockets 14.

Figure 10:
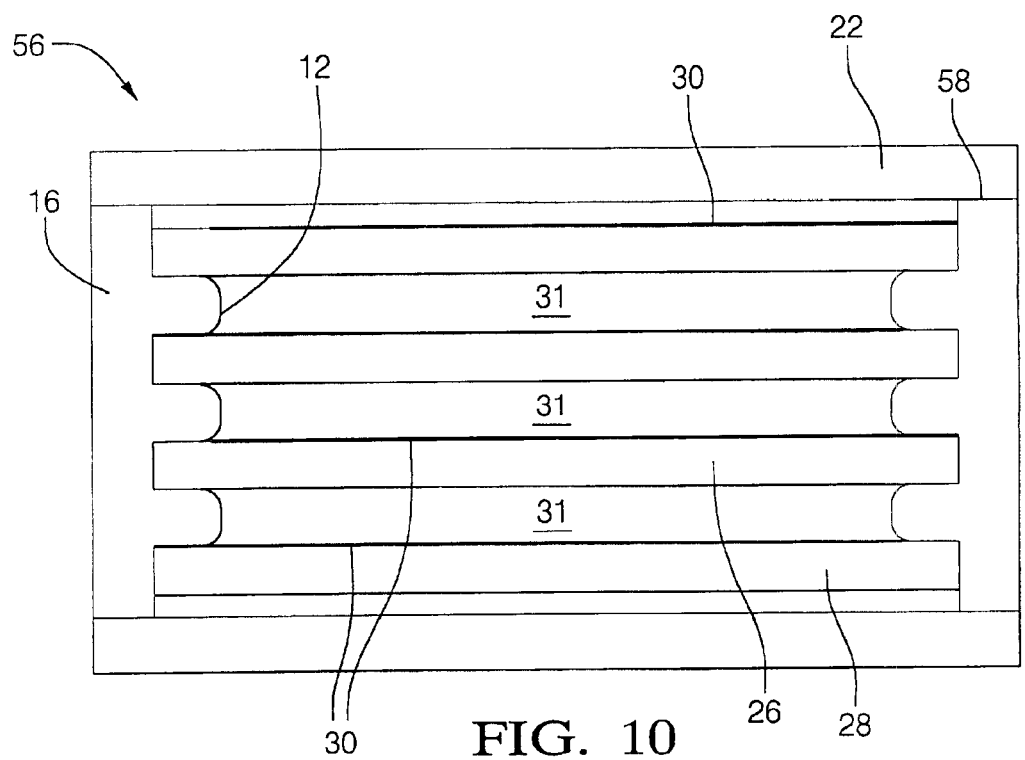
FIG. 10 is a sectional end view taken along a line midway along the length of a single dielectric barrier edge-connected non-thermal plasma reactor element in accordance with the present invention.

In FIG. 10, an alternate embodiment comprising a single dielectric edge-connected element 56 is shown having plasma cells 31 bounded on one side by dielectric and on an opposite side by electrode 30. The single dielectric edge-connected element 56 is employed, for example, when a lower cost reactor is desired. For the single dielectric edge-connected element 56 embodiment, back-to-back mirror image electrode plates are not employed. In the single dielectric edge-connected element 56, pockets 14 contain a single electrode plate 26 or 28 wherein each plasma cell 31 is bounded on one side by dielectric and on the other side by an electrode 30. The electrode plates 26, 28 are arranged to alternate polarity with each successive pocket 14.

Edge connectors 10 are shown with outer plates 22 joined at the top and bottom of the edge connectors 10, forming an edge connected frame 20 (frame 20 best seen in FIG. 3). The electrode plates 26, 28 may be inserted into the edge connectors before, during, or after the edge-connected frame 20 is formed. Typically, the electrode plates 26, 28 are inserted into the edge connected frame 20, the edges of the electrode plates 26, 28 having the terminal leads 32, 34 aligned and connected using a conductive media such as a thick film silver conductor, and the arrangement is bonded such as with ceramic cement, recrystalizable glass, or with a dielectric covered metallic braze over and around the bus paths.

In some cases, the electrode plates 26, 28 are inserted into an unfired edge connector 10. During firing, the edge connector 10 shrinks thereby securing the plates 26, 28. This approach is used less often since firing temperatures for conventional structural ceramic materials may prohibit the use of relatively inexpensive electrode materials such as silver. However, for application temperatures below 600° C., many dielectric materials, such as those in the class of low temperature, co-fireable ceramics, can be used with inexpensive electrode inks. Alternately, the electrode 30 may comprise a material that can withstand the firing temperatures, such as platinum.

The various embodiments of the present edge-connected element are assembled to provide the present edge-connected non-thermal plasma reactors, such as the reactor 44 shown in FIG. 7, generally further including the high temperature housing 48 surrounding the element or combination of elements, an insulated conductor connecting the power bus path 42 to a high voltage power source, a ground conductor connecting to ground bus path 40, an inlet for admitting a fluid stream into the plasma cells, an outlet for discharging a treated fluid stream from the plasma cells, and means for directing exhaust gas through the plasma cells 31.

The ground and power bus paths 40, 42, respectively, are formed between ground bus connection lead 32 or power bus connection lead 34 extending over the front of the edge connector 10. The ground and power bus terminals 40, 42 comprise conductive material, typically thick film silver. The bus terminals 40, 42 may also comprise any other suitable configuration, such as using brazing, or welding with or without metal ribbon connections. After bus terminals 40, 42 have been made to the power and ground connections away from the element 46, the bus terminals 40, 42 and connections are typically covered by a dielectric encapsulent 52 to prevent arcing.

The edge-connected reactor element 46 provides the ability to accommodate a significant level of thermally induced expansion of materials without building up significant thermal expansion induced stress within the reactor element 46. Features that support this capability are that rigid attachment of the electrode plates 26, 28 to the edge connectors 10 need only occur at the front or rear of the element 46, where the bus connections are made. Pockets 14 compliantly engage and support electrode plates 26, 28 with electrode plates 26, 28 free to expand within the edge-connected frame 20. When packaged, the dielectric retention mat 50 supports the element 46 completely around the reactor element 46 and along the front and rear portions of the element 46 away from the gas flow. As a result, a compliant dielectric mat 50 is used, when the reactor element 46 is packaged, to hold the electrode plates 26, 28 in position while allowing for thermal expansion. The retention mat 50 provides a compliant pressure against exterior portions of the reactor element 46 adjacent the housing 48 and front and rear end portions of the element 46, thereby providing compliant fixturing for the electrode plates 26, 28 packaged in the housing 48. Preferably, a dielectric, high temperature adhesive is disposed at the front or rear of the element to fasten the electrode plates 26, 28 to the edge-connected frame 20, with the adhesive being disposed over and around said bus paths so as to fix and protect the bus paths as well as secure the assembly together while the other design features reduce the effects of thermal induced expansion. Therefore, the high temperature adhesive provides a hard attach point for the bus paths while thermally induced stress is reduced by the expansion features such as the electrode plates 26, 28 partially constrained by pockets 14 and the mat 50 providing compliant support for the electrode plates 26, 28.

Figure 11:
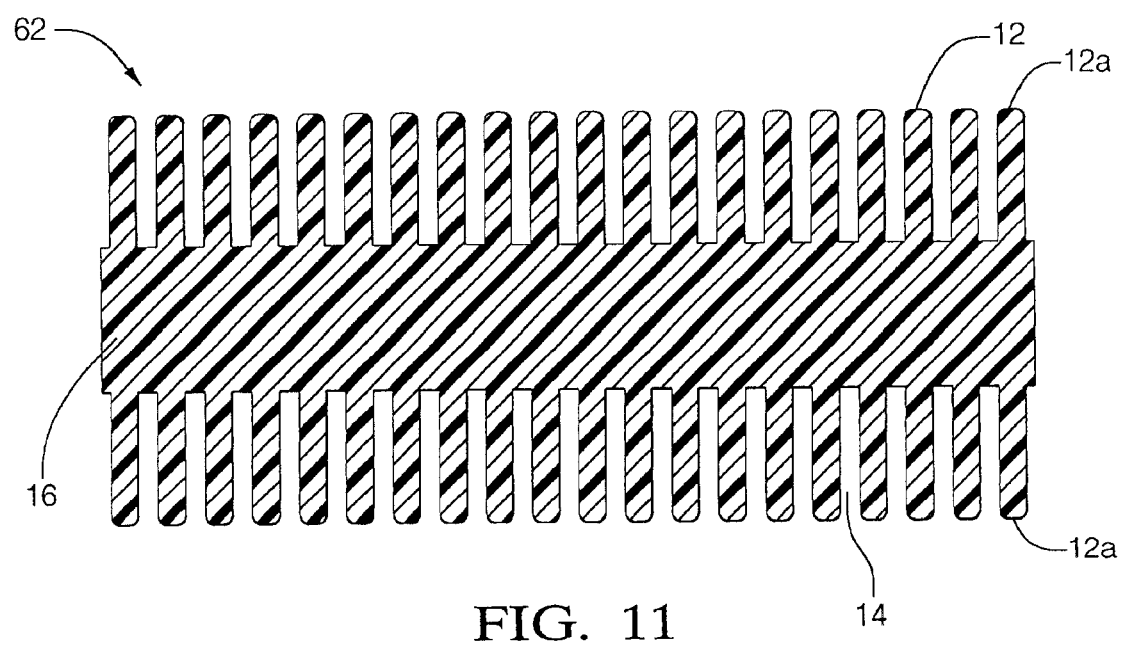
FIG. 11 is a side view of a linking dielectric edge connector.

FIG. 11 provides a side view of a linking edge connector 62. Linking edge connectors 62 are used to create a large-scale reactor element from smaller reactor element modules. Linking edge connectors 62 have a central backplane 16 and a plurality of tines 12 protruding along two opposite major surfaces of said backplane 16, said plurality of tines 12 being spaced apart from one another at regular intervals so as to form pockets 14 between adjacent tines 12. As with the other embodiments, the dimensions of the backplane 16 are selected to withstand the mechanical requirements as well as to prevent the possibility of dielectric breakdown.

Figure 12:
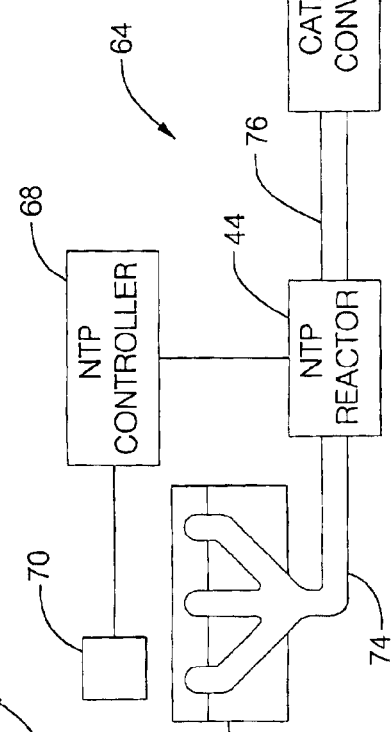
FIG. 12 is a schematic diagram showing a non-thermal plasma system including an edge-connected non-thermal plasma reactor in accordance with the present invention for the conversion of NOx in an automotive vehicle.

FIG. 12 indicates an exhaust treatment system 64 for an automotive vehicle having a direct injection diesel engine 66, or another engine operating with lean combustion, and including an edge-connected non-thermal plasma reactor 44 formed in accordance with the invention. The reactor 44 is connected with a controller 68 that is supplied with electrical energy from a source 70 and provides high voltage, high frequency AC power to the reactor 44. The diesel engine exhaust stream 74 carries emissions of nitrogen oxides, hydrocarbons, nitrogen, oxygen, water, carbon monoxide, and carbon dioxide to the reactor 44. A non-thermal plasma developed in the reactor 44 by the applied AC voltage converts the emissions to nitrogen dioxide, metastables, partially oxidized hydrocarbons, oxygen, water, nitrogen, carbon monoxide, and carbon dioxide from the reactor 44. The treated stream 76 passes to a catalytic converter 78, which completes the partial reactions to result primarily in nitrogen, water, carbon dioxide and oxygen. Conversion of the nitrogen oxides in the diesel engine exhaust 74 depends greatly on the efficiency of the reaction in the non-thermal plasma reactor 44, which is constructed in accordance with the teachings of the present invention.

The various embodiments of the edge connected non-thermal plasma reactor advantageously provide improved volumetric efficiency. The electrode is located closer to the edge of the dielectric plate thereby creating more active area. In addition, the parting line gap found in previous stacked reactor designs is eliminated and replaced by the solid dielectric backplane. The distance between the dielectric barriers and alternate polarity electrodes is reduced thereby reducing the variation in power required to initiate plasma in all cells. Further, variation in required power is reduced due to the increased precision of ceramic injection molding, and other processes which can be used to make the edge connectors.

In addition, the edge connected non-thermal plasma reactor element can be assembled without specialized fixtures, providing an advantage over previous stacked designs requiring fixturing to align many of the pieces during assembly. The short tines on the edge connector define the location of the dielectric electrode plates relative to one another. Since the location of the electrode plates is determined by the precision formed edge connector, improved dimensional control is achieved. For example, overall height can be controlled to within about 2 millimeters, thus allowing conventional canning methods to be used. The overall size of the edge-connected element can be closely controlled since it is determined primarily by the size variation of the edge connector and the thickness variation of the outside plates.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An edge-connected non-thermal plasma reactor element comprising:

an edge-connected frame comprising a pair of dielectric edge connectors secured at opposite ends to first and second outer dielectric plates to provide said edge-connected frame;

said dielectric edge connectors comprising a backplane and a plurality of tines protruding along at least one major surface of said backplane, said plurality of tines being spaced apart from one another at regular intervals so as to form pockets between adjacent tines; and a plurality of alternating polarity electrode plates, each electrode plate comprising a dielectric barrier plate having an edge received within a pocket and an electrode on the barrier plate spaced apart from the edge by a setback and having a terminal connection lead, said electrode plates disposed within said frame in an arrangement that defines the presence of at least one dielectric barrier plate next to a plasma cell, said pockets engaging opposite ends of said electrode plates.

2. The element of claim 1, comprising a double dielectric barrier edge-connected element having plasma cells bounded on top and bottom by dielectric plates.

3. The element of claim 1, comprising a double dielectric barrier edge-connected element having a plurality of mirror image electrode plate pairs disposed in said pockets of said edge-connected frame, said electrode plate pairs arranged so that their electrodes are sandwiched between each electrode plate pair whereby plasma cells formed between adjacent electrode plate pairs are bounded on top and bottom walls by a dielectric barrier plate.

4. The element of claim 1, comprising a double dielectric barrier edge-connected element having a plurality of mirror image electrode plate pairs disposed in said pockets of said edge-connected frame, said electrode plate pairs arranged so that their electrodes are sandwiched between each electrode plate pair whereby plasma cells formed between adjacent electrode plate pairs are bounded on top and bottom walls by a dielectric barrier plate; and top and bottom most pockets have electrode plate-dielectric barrier plate pairs, said electrodes facing away from said plasma cell, disposed therein.

5. The element of claim 1, comprising a double dielectric barrier edge-connected element having a plurality of mirror image electrode plate pairs disposed in said pockets of said edge-connected frame, said electrode plate pairs arranged so that their electrodes are sandwiched between each electrode plate pair whereby plasma cells formed between adjacent electrode plate pairs are bounded on top and bottom walls by a dielectric barrier plate;

a single electrode plate disposed in a top pocket formed between said first outer dielectric plate and said tines adjacent said first outer dielectric plate;

a single electrode plate disposed in a bottom pocket formed between said second outer dielectric plate and said tines adjacent said second outer dielectric plate;

whereby top and bottom most plasma cells are bounded on top and bottom by a dielectric barrier plate.

6. The element of claim 1, comprising a double dielectric barrier edge-connected element having a plurality of electrode plates disposed in said pockets of said edge-connected frame, said electrode plates having a dielectric plate-electrode-dielectric plate arrangement, wherein a single electrode is sandwiched between said dielectric plates in sufficiently close contact to both dielectric layers to avoid gaps between said electrode and said dielectric plates that would cause parasitic arcing.

7. The element of claim 1, comprising a single dielectric barrier edge-connected element, having plasma cells bounded on one side by a dielectric plate and on an opposite side by an electrode.

8. The element of claim 1, comprising a single dielectric baffler edge-connected element, wherein a single electrode plate is disposed in said pockets of said edge-connected frame to effect an alternating polarity arrangement wherein plasma cells are bounded on one side by a dielectric plate and on an opposite side by an electrode.

9. The element of claim 1, wherein said backplane comprises a gripping surface on a surface opposite said tines.

10. The element of claim 1, wherein said pockets have a first width; and top and bottom pockets formed by said outer dielectric plates and tines adjacent said outer dielectric plates have a second width that is half that of said first width.

11. The element of claim 1, wherein the setback between the edge of the barrier plate and the electrode is less than about 5 millimeters.

12. The element of claim 1, wherein setback is less than the height of the tine.

13. The element of claim 1, wherein said dielectric edge connectors are composed of a dielectric material.

14. The element of claim 1, wherein said edge connectors comprise linking edge connectors having a central backplane and a plurality of tines protruding along two opposite major surfaces of said backplane, said plurality of tines being spaced apart from one another at regular intervals so as to form pockets between adjacent tines.

15. The element of claim 1, wherein said edge-connected frame comprises an integral frame.

16. The element of claim 1, wherein said edge-connected frame comprises discrete edge connector and outer dielectric plate sections joined together to form said edge-connected frame.

17. A non-thermal plasma reactor having an edge-connected element comprising:

an edge-connected frame comprising a pair of dielectric edge connectors secured at opposite ends to first and second outer dielectric plates to provide said edge-connected frame;

said dielectric edge connectors comprising a backplane and a plurality of tines protruding along at least one major surface of said backplane, said plurality of tines being spaced apart from one another at regular intervals so as to form pockets between adjacent tines; and a plurality of alternating polarity electrode plates, each electrode plate comprising a dielectric barrier plate having an edge received within a pocket and an electrode on the barrier plate spaced apart from the edge by a setback and having a terminal connection lead, said electrode plates disposed within said frame in an arrangement that defines the presence of at least one dielectric barrier next to a plasma cell, said pockets engaging opposite ends of said electrode plates;

a housing surrounding said edge-connected element and spaced therefrom by a retention mat supporting said edge-connected element in said housing;

an inlet for admitting a stream to be treated into said plasma cells;

an outlet for discharging a treated fluid stream from said plasma cells;

a power bus path for connecting power electrode plates to a high voltage source;

a ground bus path for connecting the ground electrodes to ground; and means for directing said fluid stream through said plasma cells.

18. The reactor of claim 17, wherein electrode plates are rigidly connected to said edge-connected frame at front or rear of said reactor element and are otherwise compliantly supported by said pockets thereby providing electrode plates that are free to expand within the edge-connected frame in response to thermally induced stress.

19. The reactor of claim 18, further comprising a dielectric, adhesive attaching said electrode plates to said edge connected frame, said adhesive being disposed over and around said bus paths to fix and protect said bus paths and secure the element assembly together.

20. The reactor of claim 17, wherein said retention mat comprises a dielectric retention mat providing a compliant pressure against exterior portions of said reactor element adjacent said housing and front and rear end portions of said reactor element, thereby providing compliant fixturing for said electrode plates packaged in said housing.

21. The reactor of claim 17, comprising a double dielectric barrier edge-connected element having plasma cells bounded on top and bottom by dielectric plates.

22. The reactor of claim 17, comprising a double dielectric barrier edge-connected element having a plurality of mirror image electrode plate pairs disposed in said pockets of said edge-connected frame, said electrode plate pairs arranged so that their electrodes are sandwiched between each electrode plate pair whereby plasma cells formed between adjacent electrode plate pairs are bounded by dielectric barrier plates.

23. The reactor of claim 17, comprising a double dielectric barrier edge-connected element having a plurality of mirror image electrode plate pairs disposed in said pockets of said edge-connected frame, said electrode plate pairs arranged so that their electrodes are sandwiched between each electrode plate pair whereby plasma cells formed between adjacent electrode plate pairs are bounded by dielectric barrier plates; and top and bottom pockets have electrode plate-dielectric barrier plate pairs, said electrodes facing away from said plasma cell, disposed therein.

24. The reactor of claim 17, comprising a double dielectric barrier edge-connected element having a plurality of mirror image electrode plate pairs disposed in said pockets of said edge-connected frame, said electrode plate pairs arranged so that their electrodes are sandwiched between each electrode plate pair whereby plasma cells formed between adjacent electrode plate pairs are bounded by dielectric barrier plates;

a single electrode plate disposed in a top pocket formed between said first outer dielectric plate and said tines adjacent said first outer dielectric plate;

a single electrode plate disposed in a bottom pocket formed between said second outer dielectric plate and said tines adjacent said second outer dielectric plate;

whereby top and bottom plasma cells are bounded on top and bottom by dielectric barrier plates.

25. The reactor of claim 17, comprising a double dielectric barrier edge-connected element having a plurality of electrode plates disposed in said pockets of said edge-connected frame, said electrode plates having a dielectric plate-electrode-dielectric plate arrangement, wherein a single electrode is sandwiched between said dielectric barrier plates in contact therewith to avoid gaps between said electrode and said dielectric barrier plates that would cause parasitic arcing.

26. The reactor of claim 17, comprising a single dielectric barrier edge-connected element, having plasma cells bounded on one side by a dielectric plate and on an opposite side by an electrode.

27. The reactor of claim 17, comprising a single dielectric barrier edged-connected element, wherein a single electrode plate is disposed in said pockets of said edge-connected frame to effect an alternating polarity arrangement wherein plasma cells are bounded on one side by a dielectric plate and on an opposite side by an electrode.

28. The reactor of claim 17, wherein said backplane comprises a gripping surface on a surface opposite said tines.

29. The reactor of claim 17, wherein a majority of said pockets have a first width; and top and bottom pockets formed by said outer dielectric plates and tines adjacent said outer dielectric plates have a second width that is half that of said first width.

30. The reactor of claim 17, wherein the setback between the edge of the barrier late and the electrode is less than about 5 millimeters.

31. The reactor of claim 17, wherein the setback is less than the height of the tine.

32. The reactor of claim 17, wherein said dielectric edge connectors are composed of dielectric material.

33. The reactor of claim 17, wherein said edge connectors comprise linking edge connectors having a central backplane and a plurality of tines protruding along two opposite major surfaces of said backplane, said plurality of tines being spaced apart from one another at regular intervals so as to form pockets between adjacent tines.

34. The reactor of claim 17, wherein said backplane is continuous over opposite sides of said edge-connected non-thermal plasma reactor element when assembled thereby preventing charge leakage.

35. The reactor of claim 17, wherein said gripping surface of said backplane further serves to create a tortuous path between said backplane and said mat material thereby reducing the potential for untreated gas to leak between said backplane and said retention mat.

36. The reactor of claim 17, wherein said edge-connected frame comprises an integral frame.

37. The reactor of claim 17, wherein said edge-connected frame comprises discrete edge connector and outer dielectric plate sections joined together to form said edge-connected frame.

* * * * *